US005606995A

United States Patent [19]
Raftis

[11] Patent Number: 5,606,995
[45] Date of Patent: Mar. 4, 1997

[54] INVERSION-RESISTANT, READILY OPENABLE TIDE GATE VALVE

[75] Inventor: Spiros G. Raftis, Pittsburgh, Pa.

[73] Assignee: Red Valve Company, Inc., Carnegie, Pa.

[21] Appl. No.: 329,510

[22] Filed: Oct. 26, 1994

[51] Int. Cl.⁶ .................................................. F16K 15/16
[52] U.S. Cl. .......................... 137/846; 137/847; 137/850
[58] Field of Search .................................... 137/846, 850, 137/847

[56] References Cited

U.S. PATENT DOCUMENTS

| | | | |
|---|---|---|---|
| 194,329 | 8/1877 | Buhrer | 137/846 |
| 298,208 | 5/1884 | Irving | 137/846 |
| 657,007 | 8/1900 | Richter | 137/846 X |
| 2,465,628 | 3/1949 | Border | 137/850 X |
| 2,594,525 | 4/1952 | Walden et al. | 137/850 |
| 2,647,728 | 8/1953 | Smith | 137/846 X |
| 3,060,882 | 10/1962 | Peters et al. | 137/846 X |
| 3,307,571 | 3/1967 | Smith | 137/846 X |
| 3,463,159 | 8/1969 | Heimlich | 137/846 X |
| 3,465,595 | 9/1969 | Tansony | 137/846 X |
| 3,572,375 | 3/1971 | Rosenberg | 137/846 X |
| 3,626,713 | 12/1971 | Venable | 137/850 |
| 4,289,166 | 9/1981 | Haines | 137/846 |
| 4,492,253 | 1/1985 | Raftis | 137/849 |
| 4,501,374 | 2/1985 | Robertson | 137/846 X |
| 4,585,031 | 4/1986 | Raftis et al. | 137/846 |
| 4,607,663 | 8/1986 | Raftis et al. | 137/846 |
| 4,828,554 | 5/1989 | Griffin | 137/846 X |

Primary Examiner—John Rivell
Attorney, Agent, or Firm—Webb Ziesenheim Bruening Logsdon Orkin & Hanson, P.C.

[57] ABSTRACT

An inversion-resistant check valve or tide gate valve which comprises a sleeve bounding in a longitudinally-extending flow-through passage for fluids. The sleeve has an upstream fluid inlet end region mountable on a discharge end of a conduit which is elongated along a longitudinal axis of symmetry. The sleeve also has a downstream fluid outlet end region comprised of two or more lips which are opposed to each other and symmetrically arranged relative to the axis, wherein the lips extend a defined length along the axis, the defined length being within the range of about 1:1.5 to 1:9 times the diameter of the conduit.

11 Claims, 3 Drawing Sheets

INVERSION-RESISTANT, READILY OPENABLE TIDE GATE VALVE

BACKGROUND OF THE INVENTION

1. Field of the Invention

This invention generally relates to check valves, and more particularly to tide gate valves.

2. Description of the Prior Art

A check valve is essentially a valve which allows fluid flow in only one direction through a conduit, while closing and preventing back or reverse flow, when back pressure builds up downstream of the valve to a level greater than the upstream fluid pressure head.

One example where the fluid back-flow problem is especially acute occurs where such valves are used to handle raw sewage, sewer effluent and storm water. Virtually all municipalities near waterways have storm and sewer lines which empty into the water ways. When there is a storm, storm water from the streets runs into and through these sewer pipes and flows into the waterways. Sewage treatment plants discharge raw or treated sewage into the waterways. When the tide is in, these sewer pipes back fill with the water from the waterway. This leaves no or reduced storage capacity in the sewer pipes. In the event there is a large cloudburst or storm during the time that the tide is in, all or a portion of the storm water cannot get in the sewer because the sewer pipes are at least partially filled. This causes street flooding.

Another example where the fluid back flow problem is especially acute is where the check valves are used in chemical plants or municipal waste treatment plants. In such applications, it is desired to permit waste water or treatment chemicals to enter a reaction vessel or pond from a storage container without permitting the contents of the reaction vessel to back flow into the storage container as the chemical reactions proceed.

To deal with the back flow problem, particularly to prevent street flooding by storm sewers, various types of tide gate valves have been proposed. One type consists of a wooden gate which floats up when the tide comes in, thereby closing the tide gate valve to prevent the sewer pipes from filling with the tide water. When the tide goes out, the wooden gate sinks, thereby opening the tide gate valve. Another type consists of a mechanical tide gate valve made of steel. This type is subject to corrosion, which adversely affects its operation. Spring loaded valves having several moving parts also have been proposed but are unreliable in operation. Many of these prior art valves jam in the open position or otherwise fail to open or close when required. Noise, slamming or chatter are frequently prevalent with such types of check valves. Sliding, rotating, swinging and plunging parts lead to wear and failure or jamming, especially when handling slurries or other fluids containing entrained particulate solid material. Such previously proposed tide gate valves are also subject to jamming when trees, logs, bricks and the like get into the valves and prevent the gates from fully closing.

One check valve which has been developed in recent years is the duck-bill sleeve-type check valve. Such a valve entails a flexible, resilient sleeve which terminates with a symmetrically tapered duck-bill configuration and a rectilinear outlet end which opens to an oval or circular shape to accommodate successively greater fluid flow, but which closes on back pressure build-up.

One problem with such valves is that when a high back pressure is encountered, the valve's lips are prone to collapse and invert, thus permitting an undesirable back flow of fluid. This problem is intensified for large size valves on the order of 24 inches or even greater diameter, because the larger the diameter of the valve, the larger the area of the valve and, in such cases, even a relatively low back pressure will provide sufficient force to collapse and invert the valve's lips, thus allowing reverse flow or back flow of fluid to take place.

Another related design problem associated with the tide gate valve concerns the ease of opening the valve. The more one attempts to design the valve to resist inversion, the less easy the valve is to open. Thus if one constructs the valve with rigid materials, the valve will certainly resist inversion and sagging, but at the expense of making the valve much tougher to open. The reverse situation also is true. That is, if one constructs the valve with very flexible materials, the valve will open easily, but at the expense of resisting inversion.

Improved tide gate valves are disclosed in U.S. Pat. Nos. 4,492,253; 4,585,031; and 4,607,663.

A need remains in the art for a duck-bill sleeve-type check valve or tide gate valve which will open with a very low head pressure, wherein the valve can be made of thin and flexible materials, yet where the valve retains the ability to resist inversion during periods of high back flow pressure.

SUMMARY OF THE INVENTION

1. Objects of the Invention

It is a general object of this invention to provide a reliable, improved tide gate valve which resists inversion of the valve lips, but which nevertheless opens readily when subjected to low pressures.

It is another object of this invention to provide a tide gate valve which opens and closes in response to a predetermined minimum pressure differential between the interior and exterior of the sleeve, and which nevertheless is highly resistant to inversion.

It is yet another object of this invention to provide such a tide gate valve with a pair of highly flexible valve lips which are substantially longer than those of the prior art, the lips functioning to prevent inversion while still permitting the valve to open and close with a minimum pressure head.

It is yet another object of this invention to provide such a tide gate valve with an intermediate region much thinner and more flexible than known in the prior art, where the intermediate region functions to prevent sagging, but where the prevention of inversion is accomplished not by the intermediate region, but by the substantially longer lips.

2. Features of the Invention

In keeping with these objects and others which will become apparent hereinafter, one feature of this invention resides, briefly stated, in an inversion-resistant tide gate valve which comprises a sleeve bounding a longitudinally-extending flow-through passage for fluids. The sleeve has an intermediate region which is associated at a first upstream end with an upstream fluid inlet region mountable on a discharge end of a conduit which is elongated along a longitudinal axis of symmetry. The intermediate region at the downstream end has a fluid outlet region comprised of two or more lips which are opposed to each other and are symmetrically arranged relative to the axis, and are substantially longer than lips of the prior art as defined and disclosed in more detail below, the lips functioning to prevent inversion of the valve. The lips are formed of one or more plies.

of an elastomer material with or without fabric reinforcing supports or members. In operation, the lips will flop over to seal the valve and it is impossible to invert the valve by driving the massive duck-bill or lips back into the conduit, thus preventing inversion of the valve.

Since the lips are thin and flexible, they are easily movable from a closed position, in which the lips sealingly engage each other, to an open position in which the lips are located apart from each other, in response to a minimal pressure head within the passage and exerted in a direction downstream of the passage.

In accordance with this invention, the intermediate region of the sleeve is constituted, at least in part, of a flexible material. Because the design of the lips prevents inversion of the valve, the intermediate region of the sleeve can be comprised of a much thinner and more flexible material than previously known in the prior check valve art. For example, provided it is of sufficient strength to prevent sagging, the intermediate region can be comprised of a minimum of reinforcing plies which extend along the entire length of the intermediate region and operate to resist outward bulging and deformation of the intermediate region in response to high pressure heads within the passage.

The novel features of the invention are set forth in detail in the appended claims. The invention itself, however, both as to its construction and its method of operation, together with additional objects and advantages thereof, best will be understood from the following description of specific embodiments when read in connection with the accompanying drawings.

DETAILED DESCRIPTION OF THE PREFERRED EMBODIMENTS

Check valves of the general type of the present invention have been known by several terms, including tide gate valves and duck-bill sleeve-type check valves. In this detailed description of the preferred embodiments of the present invention, the term "tide gate valve" will generally be used, but it is to be understood that this is only one of several synonymous terms for the same type of valve.

Figure 1:
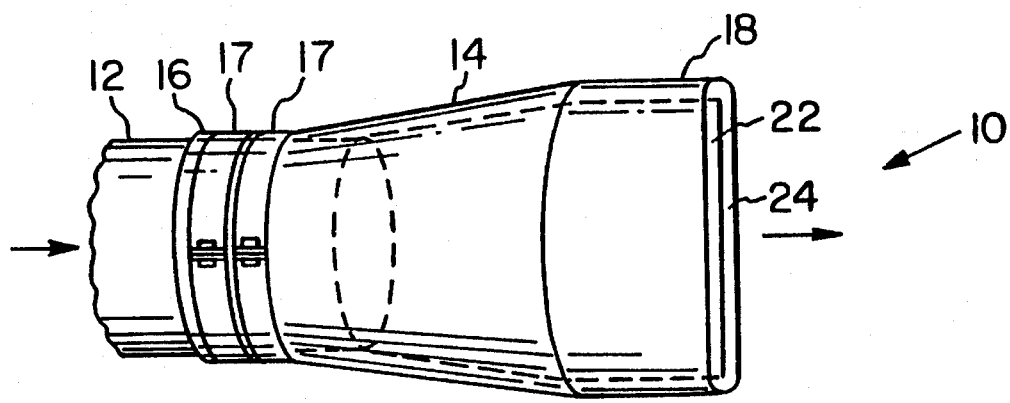
FIG. 1 is a side elevational view of a tide gate valve of the prior art mounted at the discharge end of a partially broken away conduit shown in phantom.

Referring now to FIG. 1, a prior art tide gate valve 10 is shown mounted at a discharge end of a conduit 12, shown in phantom, from which fluids are discharged. The conduit 12 may be a storm sewer, an industrial waste pipe, or any pipe which discharges an effluent into a river, creek, ocean or analogous waterway or a chemical reaction vessel or any vessel known in the art where it is desired to discharge a fluid while preventing back flow into the conduit 12.

The valve 10 generally comprises a sleeve, which bounds a longitudinally-extending flow-through passage for the effluent fluid which may be a liquid or slurry, such as raw sewage, storm rain water, line, sludge, chemical slurry, scum paper stock, tailings slurry, or any industrial waste. More specifically, the sleeve has an intermediate region 14 which is associated at a first upstream end with a generally cylindrical upstream fluid inlet region 16 mounted on and around the discharge end of conduit 12. Fluid inlet region 16 may be secured to conduit 12 by any devices commonly known in the art such a bands, clamps, etc. Clamps 17 are shown in FIG. 1. Intermediate region 14 can be cylindrical, but in most applications it is slightly tapered. It is shown in the drawings of the present invention in a tapered embodiment.

The intermediate region 14 is associated at a downstream end with a fluid outlet region 18. Fluid outlet region 18 is more specifically comprised of lips or bills 22 and 24. The lips 22 and 24 are flattened and have broad planar mating surfaces facing and opposed to each other. The lips 22 and 24 extend longitudinally along the length of valve 10 over the entire length of fluid outlet region 18, which is a distance generally equal to about ½ of the diameter of conduit 12. Generally conduit 12 when used in storm or sewer water applications has a large diameter in the range of 12 inches to 48 inches or more. However, in some applications, as for example, in chemical reaction vessels, the diameter of conduit 12 can be on the order of a few inches.

As an example, but in no way limiting the present invention to such small diameters for conduit 12, in the prior art example shown in FIG. 1, the ratio of the diameter of conduit 12 to the length of lips 22 and 24 is approximately 2:1. That is to say where conduit 12 is 24 inches in diameter, lips 22 and 24 are approximately 12 inches long, along the longitudinal axis of valve 10. Inversion of such a prior art valve 10 in response to back pressure is prevented in the prior art by one of the following designs. The valve sleeve can be comprised of at least 3 converging sides with embedded reinforcing elements in the sleeve as described in U.S. Pat. No. 4,492,253. Alternatively, the valve can be designed with a multiple-ply sleeve having a rigid support member embedded therein as described in U.S. Pat. No. 4,585,031. Finally, a series of strengthening pads can be formed as part of the lips 22 and 24 and the valve sleeve as described in U.S. Pat. No. 4,607,663. To the extent necessary to define the present invention, U.S. Pat. Nos. 4,492, 253, 4,585,031 and 4,607,663 are hereby incorporated herein by reference.

Figure 2:
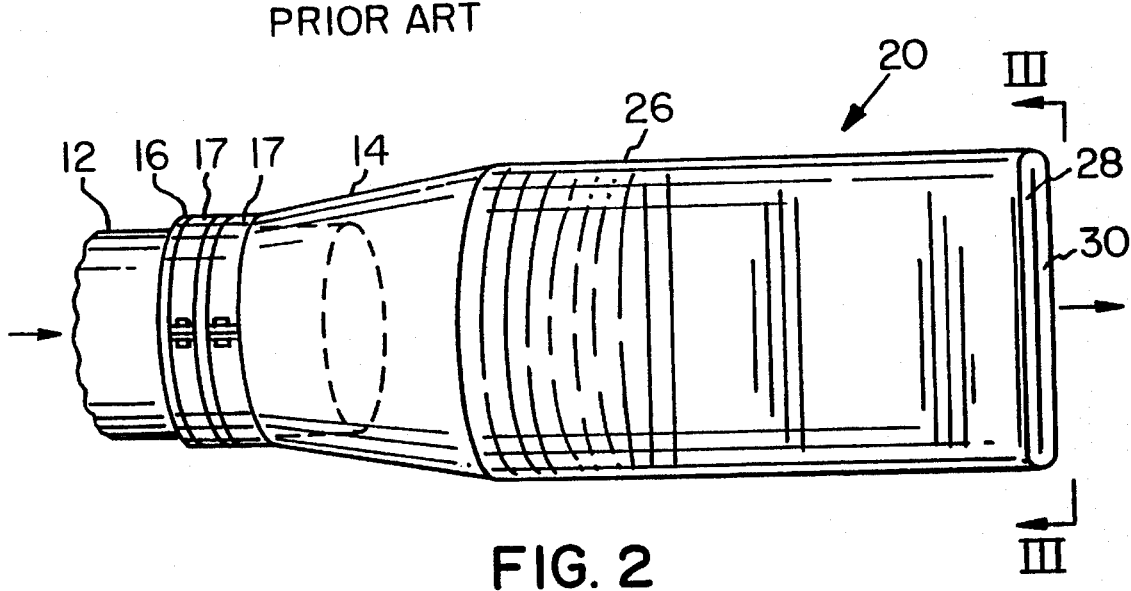
FIG. 2 is a side elevational view of a tide gate valve of the present invention mounted at the discharge end of a partially broken away conduit shown in phantom.

The tide gate valve 20 of the present invention, as depicted in FIG. 2, is also generally comprised of a sleeve, having an intermediate region 14, the upstream end of which is associated with the cylindrical upstream fluid inlet region 16 mounted on and around the discharge end of conduit 12 and secured by clamps 17. The intermediate region 14 is again shown in its tapered embodiment, and includes a second downstream end which is associated with fluid outlet region 26. Fluid outlet region 26 is comprised of a pair of lips 28 and 30. The lips 28 and 30 are flattened and have broad planar mating surfaces facing each other, and extend along the entire length of fluid outlet region 26.

However, unlike tide gate valves of the prior art, fluid outlet region 26, and more specifically, lips 28 and 30 extend over a length along the longitudinal axis of valve 20 which is far greater than those of the prior art. In a preferred embodiment, the length which lips 28 and 30 extend along the axis of valve 20 is equal to a ratio of the diameter of conduit 12 to the length of lips 28 and 30 in a range of between 1:1.5 to 1:9.

For example, where the diameter of conduit 12 is 2 feet, the length of lips 28 and 30 is preferably between 3 feet to 18 feet. In the embodiment shown in FIG. 2, the diameter of conduit 12 is approximately 2 feet, and lips 28 and 30 extend approximately 6 feet along the longitudinal axis of valve 20. Again it is emphasized that the diameter of conduit 12 can range from a few inches to several feet. The example is only illustrative and not limiting. Thus, if conduit 12 were 2 inches in diameter, lips 44 and 46 extend approximately 6 inches along the longitudinal axis of valve 40.

Figure 3:
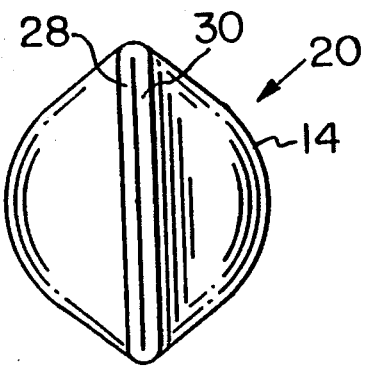
FIG. 3 is a sectional view taken along the line III—III of FIG. 2 showing a front view of the tide gate valve of the present invention.

FIG. 3 is a sectional view taken on line III—III of FIG. 2, providing a view of the discharge end of valve 20, including lips 28 and 30 and intermediate region 14. Unlike the tide gate valves of the prior art, where intermediate region 14 had to be significantly reinforced to prevent inversion, intermediate region 14 of the present invention is comprised of fewer plies of a material with minimal supporting or reinforcing members. The intermediate region 14 in the present invention does not function to prevent inversion. Inversion is prevented in the valve of the present invention, by the length of lips 28 and 30 causing them to flop over or sag. In other words, these lips are of such length as compared to the diameter of the conduit 12, as to enable the lips to collapse and to sag, as discussed more fully below, and thus prevent inversion when back pressure is applied.

Figure 4:
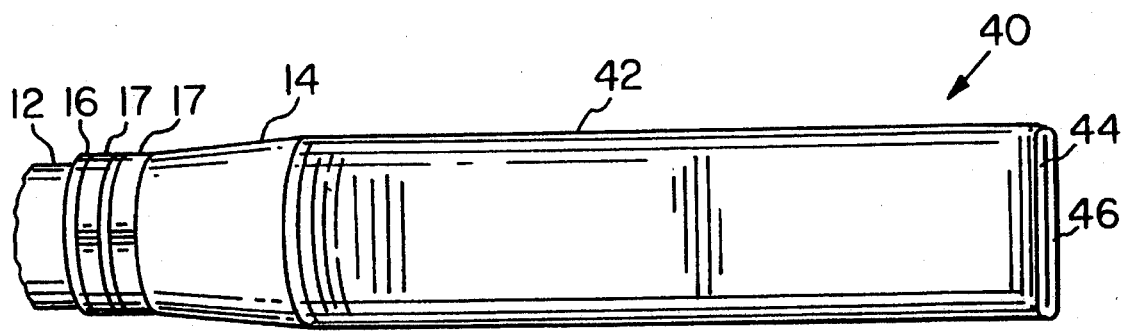
FIG. 4 is a side elevational view of an alternative embodiment of a tide gate valve of the present invention mounted at the discharge end of a partially broken away conduit shown in phantom.

FIG. 4 is a side elevational view of an alternative embodiment of the present invention, wherein valve 40 is shown with fluid outlet region 42, which is more specifically comprised of lips 44 and 46. Fluid outlet region 42, and more particularly, lips 44 and 46 which comprise fluid outlet region 42, extend in a longitudinal direction far in excess of the diameter of conduit 12. More specifically, in the embodiment shown in FIG. 4, conduit 12 is approximately 2 feet in diameter and lips 44 and 46 extend approximately 10 feet along the longitudinal axis of valve 40.

During periods of discharge of effluent from conduit 12, fluid outlet region 42 will assume the more linear position shown in FIG. 4 which corresponds with the longitudinal axis of valve 40. More specifically, during discharge, the valve 40 has a rectilinear or circular flow-through passage about and along the central longitudinal axis of symmetry, which central axis is also the central axis of the intermediate region 14, fluid inlet region 16 mounted on and around the discharge end of conduit 12, and of conduit 12 itself. In response to a pressure head of a determined minimum magnitude exerted in the downstream direction of the passage such that the pressure inside the passage due to the fluid flow therethrough is greater than the pressure outside the passage, the fluid outlet region 42 extends along the longitudinal axis of conduit 12 and intermediate region 14. Lips 44 and 46 move apart from each other to an open position in which the fluid within the passage may flow past the opened lips to the exterior of the valve.

Figure 5:
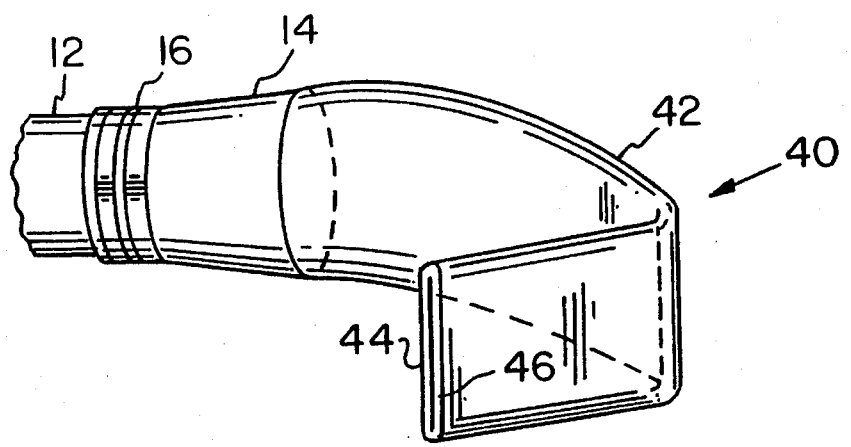
FIG. 5 is a second side elevational view of the tide gate valve shown in FIG. 4, showing sagging of the valve lips.

Conversely, during periods where discharge of effluent from conduit 12 is minimal or nonexistent, fluid outlet region 42, and more specifically, lips 44 and 46 are vulcanized in a closed position and will return to this position. The legs will then sag of their own weight due to the fact that their length far exceeds the diameter of conduit 12. FIG. 5 is a side elevational view of the tide gate valve 40, showing the sagging of fluid outlet region 42, which is more specifically comprised of lips 44 and 46. This sagging prevents lips 44 and 46 from entering conduit 12 and permitting inversion of valve 40 during periods of backflow pressure.

Figure 6:
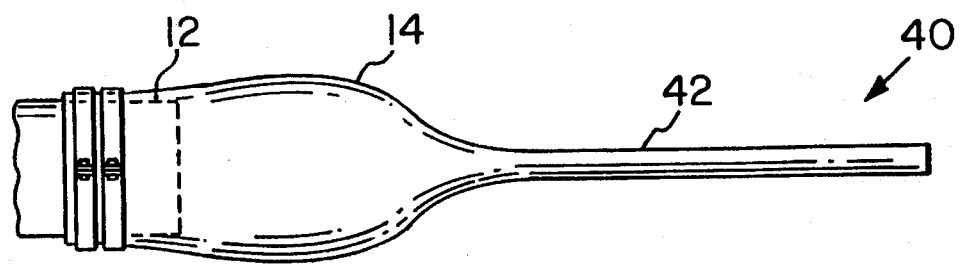
FIG. 6 is a plan view of the tide gate valve shown in FIG. 4 showing the valve lips in the collapsed position.

FIG. 6 is a top plan view of the valve 40. Intermediate region 14 and fluid outlet region 42 are shown. Further illustrated in FIG. 6 is the collapse of lips 44 and 46 during periods where discharge of effluent from conduit 12 is minimal or nonexistent. The collapsing of lips 44 and 46 upon each other permits their flattened and broad planar mating surfaces facing and opposed to each other to form a watertight seal extending along the entire length of fluid outlet region 42, thus preventing any backflow through valve 40 into conduit 12.

Thus, when the fluid flow ceases, or when a back pressure is exerted in the upstream direction of the passage such that the back pressure is greater by a predetermined amount than the internal pressure, then the lips 44 and 46 perform two functions. First, lips 44 and 46 move toward each other and return to the closed position to form a watertight seal along the entire length of fluid outlet region 42. Second, because the lips 44 and 46 are made of one or more plies of material containing minimal or no reinforcing supports or members, the lips are extremely flexible and pliable and will sag. It is simply impossible to drive lips of the length within the ratios set forth above, back into the conduit 12 during periods of back pressure and/or little or no discharge, thus preventing backflow and inversion of valve 40.

It should be noted that while FIGS. 2–5 show the lips in a substantially vertical orientation, it is to be understood that this orientation is not the only orientation that can be used with the present invention. Where valve 40 is rotated 90 degrees along its longitudinal axis from the position shown in FIG. 4, lips 44 and 46 will lie in a substantially horizontal plane. When the lips sag in this orientation, further assurance that the lips will seal and not invert is provided by the fact that the lips will flop over to nearly a 90 degree angle from the longitudinal axis of valve 40.

The intermediate region 14 of the present invention is also different in another aspect than valves of the prior art, in that it contains minimal or no reinforcing elements to prevent the inversion of the valve. Further, intermediate region 14 generally is comprised of a minimum member of plies of material, which is also substantially different than sleeves of the prior art, which were typically multiple-ply in design so as to prevent inversion of the valve.

EXAMPLE

Figure 7:
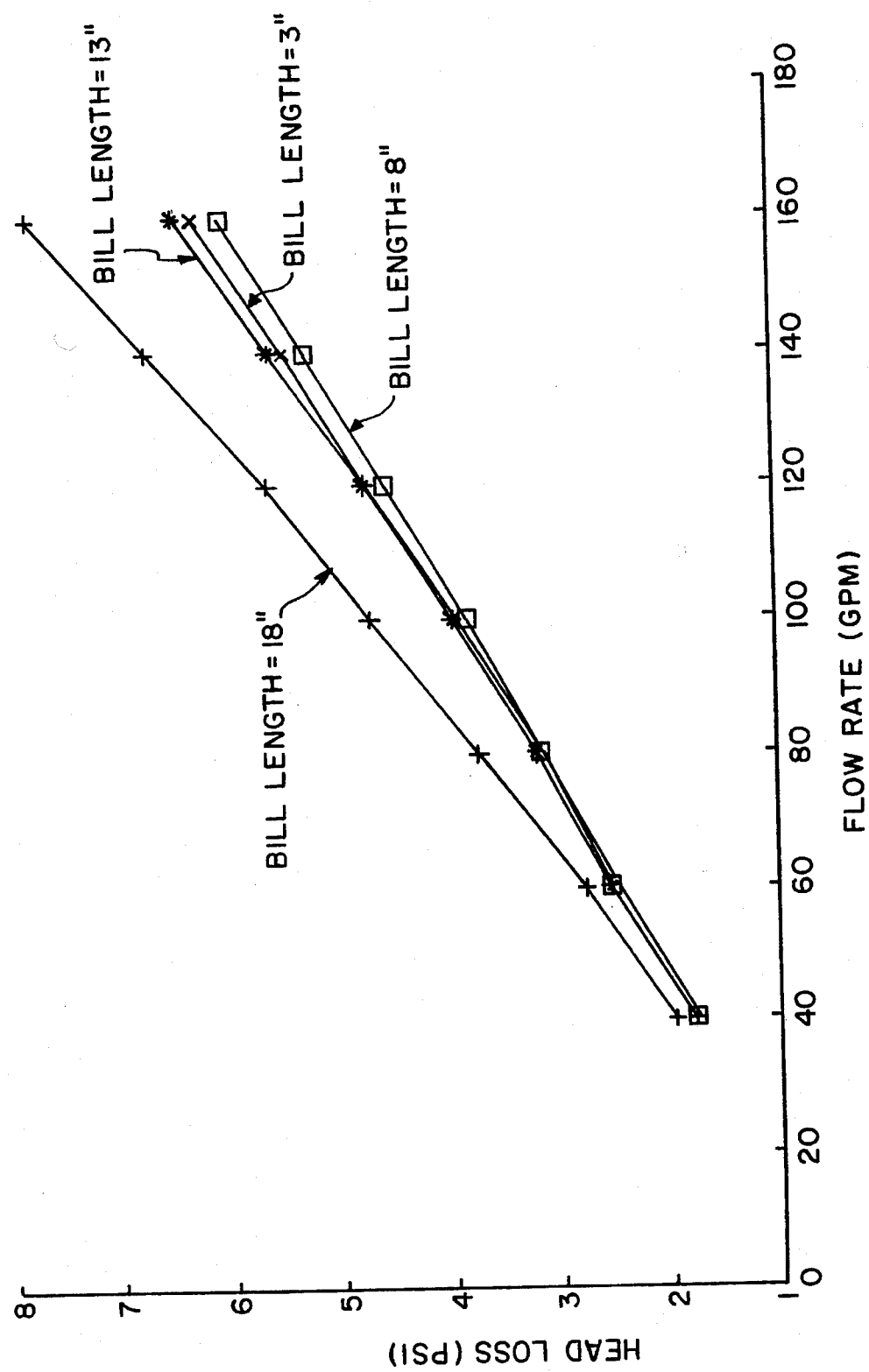
FIG. 7 is graph showing head loss versus flow rate for a series of four tide gate valves according to the present invention for mounting on a 2 inch diameter discharge conduit having lip or bill lengths of 3, 8, 13 and 18 inches respectively.

FIG. 7 is a graph of experimental results illustrating headloss versus flow rate for a 2 inch diameter conduit. Again, it is emphasized that the diameter of conduit 12 can range from fractions of an inch to several feet. A conduit of 2 inches has been selected as representative for all diameters, and further, because this diameter is particularly available and lends itself to experimentation. In this example, four embodiments of the present invention were tested, namely four valves having lips (also known as "bills") with individual lengths of 3 inches, 8 inches, 13 inches and 18 inches, respectively. The valves were set up to discharge to atmosphere. A pressure tap was inserted into the conduit 12 upstream of the valve, and the instrument line was filled with water to purge air out of the line. The pressure at a flow rate of zero was recorded. The flow rate was increased to 30 gallons per minute and the pressure was again recorded. The flow rate was then increased in increments of roughly 30 gallons per minute and each time the pressure upstream was recorded. This was repeated until the flow rate reached or exceeded 150 gallons per minute.

Similarly, the flow rate was decreased in decrements of roughly 30 gallons per minute and at each decrease in flow rate the pressure upstream of the check valve was recorded, until the flow rate reached a value of zero gallons per minute. These steps were then repeated for each of the remaining valves.

With a bill length of 18 inches the headloss through the valve varied from 1.5 psi at 30 gallons per minute to 7.8 psi at 160 gallons per minute. With a bill or lip length of 3 inches, the head loss was 1.5 psi at 30 gallons per minute and 6.1 psi at a flow rate of 160 gallons per minute. By dividing the change in headloss by the change in lip length, it was found that the headloss in psi per inch of lip or bill length works out to roughly 0.113 at a flow rate of 160 gallons per minute.

It will be understood that each of the elements described above, or two or more together, also may find a useful application in other types of constructions different from the types described above.

While the invention has been illustrated and described as embodied in an inversion-resistant, readily openable tide gate valve, it is not intended to be limited to the details shown, since various modifications and structural changes may be made without departing in any way from the spirit of the present invention.

What is claimed as new and desired to be protected by Letters Patent is set forth in the appended claims.

I claim:

1. In an inversion-resistant tide gate valve comprising:
    (a) a sleeve bounding a longitudinally-extending flow-through passage for fluids;
    (b) said sleeve having an upstream fluid inlet end region mountable on a discharge end of a conduit which is elongated along an axis of symmetry;
    (c) said sleeve having a downstream fluid outlet end region which is further comprised of a first lip and a second lip opposed to each other and symmetrically arranged relative to said axis, said lips being movable from a closed position in which the lips sealingly engage each other, to an open position in which the lips are located apart from each other in response to a pressure head within said passage and exerted in a direction downstream of said passage;
    (d) said sleeve having an intermediate region symmetrically arranged relative to said axis, said intermediate region merging and being jointly movable with said first and second lips,
    the improvement comprising:
    said lips extending a defined length along said axis, a ratio of a diameter of said conduit to said defined length being within a range of about 1:1.5 to 1:9;
    the length, weight and flexibility of said lips being such as to cause sagging of said lips when in said closed position, thereby precluding inversion of said lips.

2. The improvement of claim 1 wherein said intermediate region is comprised of plies of an elastomeric material, said intermediate region containing no reinforcing or supporting members embedded within any of said plies.

3. The improvement of claim 1 wherein said intermediate region is tapered.

4. The improvement of claim 1 wherein the diameter of said conduit is within a range of 12–48 inches.

5. The improvement of claim 1 wherein the diameter of said conduit is less than 12 inches.

6. The improvement of claim 1 wherein the diameter of said conduit is about 2 feet and the length of said lips is within a range of about 3 feet to 18 feet.

7. The improvement of claim 1 wherein the diameter of said conduit is about 2 inches and the length of said lips is within a range of about 3 inches to 18 inches.

8. The improvement of claim 1 wherein, during outflow through said tide gate valve at a rate of 160 gallons per minute, a headloss in psi per inch of lip length is about 0.113.

9. The improvement of claim 1 wherein said lips are in a substantially vertical orientation.

10. The improvement of claim 1 wherein said lips in the closed position are adapted to sag and flop over so that said lips are directed away from a longitudinal axis of said tide gate valve.

11. The improvement of claim 1 wherein said lips are made of one or more plies of elastomeric material, said plies containing no reinforcing supports or members.

* * * * *